United States Patent
Clover, Jr.

[11] Patent Number: 6,126,355
[45] Date of Patent: Oct. 3, 2000

[54] FASTENER FOR ADJUSTABLE SUPPORT DEVICE

[75] Inventor: William M. Clover, Jr., Buffalo, Minn.

[73] Assignee: Otto Bock, U.S., Inc., Plymouth, Minn.

[21] Appl. No.: 09/144,380

[22] Filed: Aug. 31, 1998

[51] Int. Cl.[7] .................................................. F16B 37/00
[52] U.S. Cl. ........................... 403/13; 403/22; 403/408.1; 403/299; 403/373; 411/366.1; 411/374; 411/435
[58] Field of Search .................................. 403/13, 14, 22, 403/299, 361, 373, 408.1; 411/366.1, 366.2, 366.3, 374, 435, 396, 397, 409

[56] References Cited

U.S. PATENT DOCUMENTS

| | | |
|---|---|---|
| 941,031 | 11/1909 | McBean . |
| 2,047,241 | 7/1936 | Wittel ...................................... 248/183 |
| 2,802,997 | 8/1957 | Bronkhurst et al. ....................... 339/92 |
| 3,241,427 | 3/1966 | Bosler ................................. 411/374 X |
| 3,823,526 | 7/1974 | Rose ........................................ 52/758 |
| 4,342,530 | 8/1982 | Baker et al. ............................. 411/374 |
| 4,479,734 | 10/1984 | Rother ......................................... 403/4 |
| 5,025,780 | 6/1991 | Farley ....................................... 128/20 |
| 5,068,956 | 12/1991 | Malewicz ......................... 411/372.6 X |
| 5,082,406 | 1/1992 | Cosenza .................................. 411/105 |
| 5,205,692 | 4/1993 | Kelbert et al. .......................... 411/173 |
| 5,328,312 | 7/1994 | Driscoll .............................. 43/408.1 X |

Primary Examiner—Lynne H. Browne
Assistant Examiner—John R. Cottingham
Attorney, Agent, or Firm—Frederick W. Niebuhr, Esq.; Larkin, Hoffman, Daly & Lindgren, Ltd.

[57] ABSTRACT

A fastener, for releasably securing movable panels or other components of a support device, includes a clamping member having a cap and an externally threaded shank, a clamping knob internally threaded for movement along the shank, and a retaining member having a threaded shaft received into an internally threaded aperture of the shank. The external shank threads and internal knob threads have a relatively coarse pitch, while the shaft threads and internal aperture threads have a relatively fine pitch. The clamping knob includes a recess with a locking shoulder that engages a head of the retaining member, thus to determine a locked position for the knob, preventing further movement of the knob in the axial direction away from the cap. The locked position can be set to coincide with a clamping position of the knob, or alternatively spaced apart to allow limited axial travel of the knob. The knob and cap have opposed clamping faces at the outer edges of respective resilient projections that are slightly elastically deformed during clamping, thus to provide an elastic restoring force for a positive hold of the releasably secured components. One of the clamping members, typically the cap, can include a stud or other suitable detent adapted for capture within a slot or against another feature of one of the components, to prevent rotation of that clamping member during fastening.

30 Claims, 5 Drawing Sheets

FASTENER FOR ADJUSTABLE SUPPORT DEVICE

BACKGROUND OF THE INVENTION

The present invention relates to fasteners for releasably and integrally securing otherwise movable parts, and more particularly to fasteners for fixing moveable components to adjust wheelchairs, carseats and other support devices, especially those designed to accommodate physically challenged individuals.

Wheelchairs, carseats for children, and similar support devices typically include components that are movable relative to one another to adjust arm rests, chair backs and other elements to accommodate persons of different sizes and having different physical needs. Frequently these components have slots or other openings to facilitate their coupling with nut/bolt fastening arrangements in which a threaded shank of the bolt extends through the openings of the components, and the components are contained between the nut and a head of the bolt. To facilitate coupling and release, the bolt can have a carriage feature, i.e. a square shank portion near the head, to counteract the tendency to rotate within the slot and thus facilitate securing the fastener by turning the nut. The carriage feature functions satisfactorily, however, only if the transverse (non-axial) dimension of the square is substantially equal to the width of a slot through which the bolt extends.

These fastening arrangements are prone to other difficulties including the need for tools to tighten the arrangement sufficiently to insure a secure connection, the risk of loosening or unintentional release when the arrangement is subject to vibration, protrusions or sharp edges that present a risk of injury to the individual using the support device and others, and the risk of damage to the components due to over tightening of the fastener.

Moreover, such fasteners preferably should include a means for positively retaining elements of the fastener to prevent unintentional removal and loss of one or more elements, and a means for positively locking the fastener to more securely fix the adjustable components.

A wide variety of fasteners and fastening assemblies are used in adjusting support devices, and more generally in mounting objects and connecting pieces (e.g. of sheet metal) together. For example, U.S. Pat. No. 5,205,692 (Kelbert) discloses a fastener including a bolt with an internally threaded collar that also has external threads to receive a nut and integral washer. A panel can be secured between a head portion of the bolt and the washer. The washer has elastically deformable ribs that press against the panel when the arrangement is tightened to provide a water tight seal.

U.S. Pat. No. 2,802,997 (Bronkhurst) involves a fastening mechanism including an externally threaded rod that fits into an internally threaded block. The rod further has internal threads at one end to receive a screw that provides a stop. At the other end of the rod is a wing nut and a conical washer. A multi-threaded arrangement in which the screw threads at different locations have different pitches, is shown in U.S. Pat. No. 941,031 (McBean). The purpose of the different pitches is to enable locking of the assembly at different axial positions.

In U.S. Pat. No. 2,047,241 (Wittel), a nut member with internal threads is threaded onto a spindle. The nut member has a notch that accommodates a pin fixed to a plate, thus to prevent the nut from rotating when sufficiently close to the plate.

These arrangements, while perhaps suitable for their intended purposes, fail to adequately address the needs noted above in connection with the support devices, whether intended for children or adults.

Therefore, it is an object of the present invention to provide a fastener that is more convenient to use and establishes a more reliable connection of adjustable components, even when the components are subject to vibration.

Another object is to provide a fastening apparatus that provides a secure connection of adjustable components without presenting sharp edges or protrusions.

It is a further object to provide a fastener for securing adjustable components, with fastening elements that can be selectively locked at a variety of positions relative to one another, to accommodate components of different sizes and to selectively allow limited freedom of movement of the elements relative to one another.

Yet another object is to provide a fastener for adjustable components that can be operated by hand to secure and release adjustable components, and alternatively locked to prevent a release of coupled components by hand.

SUMMARY OF THE INVENTION

To achieve these and other objects, there is provided a threaded fastener for integrally and releasably securing two or more components. The fastener includes an elongate axially extended shank having first threads and second threads. A cap is mounted to the shank in axially fixed relation thereto, and has a surface comprising a first clamping face. The fastener further includes a clamping knob having a bore therethrough, internally threaded for a threaded engagement of the knob and first threads of the shank. The knob has a surface comprising a second clamping face, which is opposed to the first clamping face of the cap when the knob and shank are threadedly engaged. The knob surface further comprises a first locking face opposite the second clamping face. Further, the fastener includes a knob retaining member. The retaining member has a surface comprising a second locking face, and is threaded for a threaded engagement with the second threads of the shank. Such engagement enables a variable axial positioning of the retaining member relative to the shank, which facilitates a selective positioning of the second locking face for a surface engagement with the first locking face of the knob when the knob and shank are threadedly engaged. The retaining member, due at least in part to a mismatch between the first threads and the second threads, tends to secure the knob against movement in a direction away from the cap when the locking faces are in their surface engagement.

Preferably the mismatch comprises a difference between a first pitch of the first threads and the second pitch of the second threads, with the second pitch being considerably finer.

In one advantageous embodiment, an internal aperture is formed within the shank, extending axially and open to at least one end of the shank. The first threads are external threads formed along the shank, while the second threads are internal threads formed within the internal aperture. Then, the retaining member has a head and a shaft integral with the head. The shaft is threaded for engagement within the internal aperture of the shank, while the head has a surface comprising the second locking face.

Preferably the clamping knob includes a recess open to a side of the knob opposite the second clamping face and extended axially into the knob toward the second clamping face. The recess at least partially contains the head of the retaining member when the locking faces are in their surface engagement. An annular shoulder, disposed within the recess, provides the first locking face. Optionally the shoulder can be positioned at a substantial depth within the recess. Then, the retaining member head is contained within the recess over a range of clamping knob travel relative to the shank ranging from a locked position in which the locking faces are engaged, to a clamping position in which the second clamping face is urged against an object or component being held by the fastener. Thus, the retaining member is capable of locking the clamping member against removal from the shank while also allowing adjustment of the knob by hand over a substantial axial distance along the shank.

Alternatively the locking shoulder can be positioned at a slight depth within the recess, which facilitates adjusting the locking member to a position in which the clamping position and locked position substantially coincide. This option is particularly useful with support devices designed for children, because the clamping knob can be locked in a manner to prevent retraction of the knob by hand, to further insure that a chosen coupling remains securely fixed.

Another aspect of the present invention is a fastener for releasably coupling at least two parts. The fastener includes a first clamping member comprising an elongate axially extended shank having first threads and second threads formed therealong. The first clamping member also includes a cap integral with the shank and having a surface comprising a first clamping face. A detent, integral with the cap, extends axially away from the cap and is spaced apart radially from the shank. The fastener also includes a clamping knob having a bore therethrough internally threaded for a threaded engagement with the first threads of the shank. A surface of the knob comprises a second clamping face, opposed to the first clamping face when the knob and shank are threadedly engaged. The shank is adapted to extend through first and second openings formed through first and second parts, respectively, to releasably couple the parts between the first and second clamping faces. When the shank extends through the openings, the detent is posioned to engage a feature of the first part to prevent rotation of the cap relative to the first part.

Preferably the feature is a wall of a slot having a substantially uniform slot width, and the detent has a detent width substantially equal to and slightly less than the slot width. In one preferred arrangement, both of the openings are slots having substantially the same width, in which case the detent can extend either through one or both of the slots.

Yet another aspect of the invention is a threaded fastener for releasably coupling two or more components. The fastener includes a first clamping member comprising an elongate axially extended shank having first threads therealong, and a cap integral with the shank and having a surface comprising a first clamping face. A second clamping member comprises a knob having a bore therethrough internally threaded for a threaded engagement with the first threads of the shank. The knob has a surface comprising a second clamping face opposed to the first clamping face when the knob and shank are threadedly engaged. At least a selected one of the knob and the cap is resilient, and is shaped to define a peripheral flexure. The associated one of the clamping surfaces comprises an outer edge of the flexure. The flexure is elastically deformed when the first and second components are releasably coupled between the knob and the cap.

Preferably both the cap and the knob are resilient, and shaped to provide peripheral flexures, both of which are elastically deformed when the components are held between the knob and the cap. This arrangement counteracts a tendency in plastic fastening elements to cold flow when maintained under compression in a fastening arrangement. In particular, the flexures because of their elastic deformation apply an elastic restoring force against the coupled components that more reliably maintains the coupling. Preferably the cap and knob are round, whereby the edges of the flexures are substantially annular. The peripheral location of the flexures maximizes the contact area, and thus the holding force, for a given amount of elastic deformation.

Thus in accordance with the present invention, a fastener that is relatively simple and easy to use provides a reliable, secure fixation of two or more adjustable components. Peripheral flexures engage the components in a manner that does not damage the components and is not subject to gradual degradation due to cold flow. The fastener can be locked, either in a clamping position or in a partially retracted position that allows hand manipulation of the clamping knob. The locking position can be adjusted by turning a retaining member threadedly engaged to the shank. Because of the finer pitch of the threads that couple the retaining member, as compared to the threads that mount the clamping knob, a positive lock is insured, along with the option to adjust the locking location.

IN THE DRAWINGS

For a further understanding of the above and other futures and damages, reference is made to the following detailed description and to the drawings, in which.

DETAILED DESCRIPTION OF THE PREFERRED EMBODIMENTS

Figure 1:
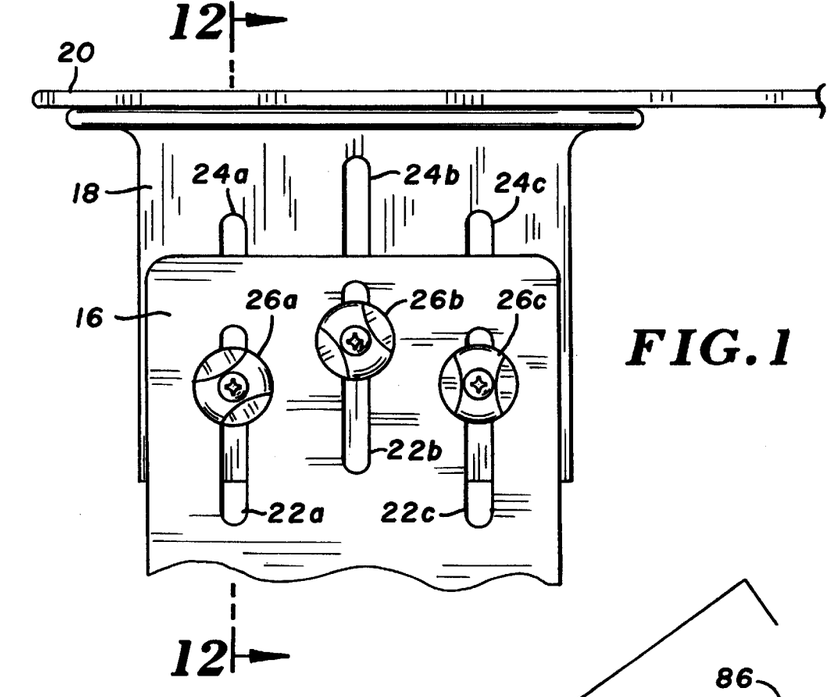
FIG. 1 is an elevational view of a pair of adjustable components of a support device, secured to one another in accordance with the present invention.

Turning now to the drawings, there is shown in FIG. 1 an adjustable armrest support arrangement including a panel 16 fixed to a wheelchair, carseat or similar support device (not shown), a movable panel 18, and an armrest 20 at the top of movable panel 18. Three elongate and vertically directed slots, indicated at 22*a–c,* are formed through the base panel, side by side. Likewise, the movable panel has slots 24*a–c,* that are spaced apart from one another for alignment with slots 22*a–c.*

Panels 16 and 18 are releasably secured by three fasteners 26*a–c,* each with a shank (not shown in FIG. 1) extending through its associated pair of slots 22 and 24. The shanks have a shank diameter substantially the same as, but slightly less than, a slot width of slots 22 and 24, taken in the horizontal direction. Consequently, when fasteners 26 are mounted as shown, but not tightly secured, panel 18 is free to move vertically relative to the fixed panel to allow adjustment of the vertical position of armrest 20. In other preferred embodiments, slots can be directed horizontally or inclined to impart the desired direction of adjustment. Slots can be provided with a width greater than that necessary to accommodate their respective shanks, to impart limited rotational or pivotal adjustment. Finally, several parts may be provided with slots extending in different directions, to provide two or more degrees of freedom in linear adjustment.

It can be appreciated that providing only one set of slots (either slots 22 or slots 24), in combination with circular openings through the other panel, would likewise allow vertical adjustments to the armrest. Providing slots in both of the panels, however, increases the range of available armrest settings. Further, it is to be appreciated that while the fasteners are shown with two substantially planar panels, a variety of other components or parts of a support device can be releasably and adjustably secured using fasteners 26.

Figure 2:
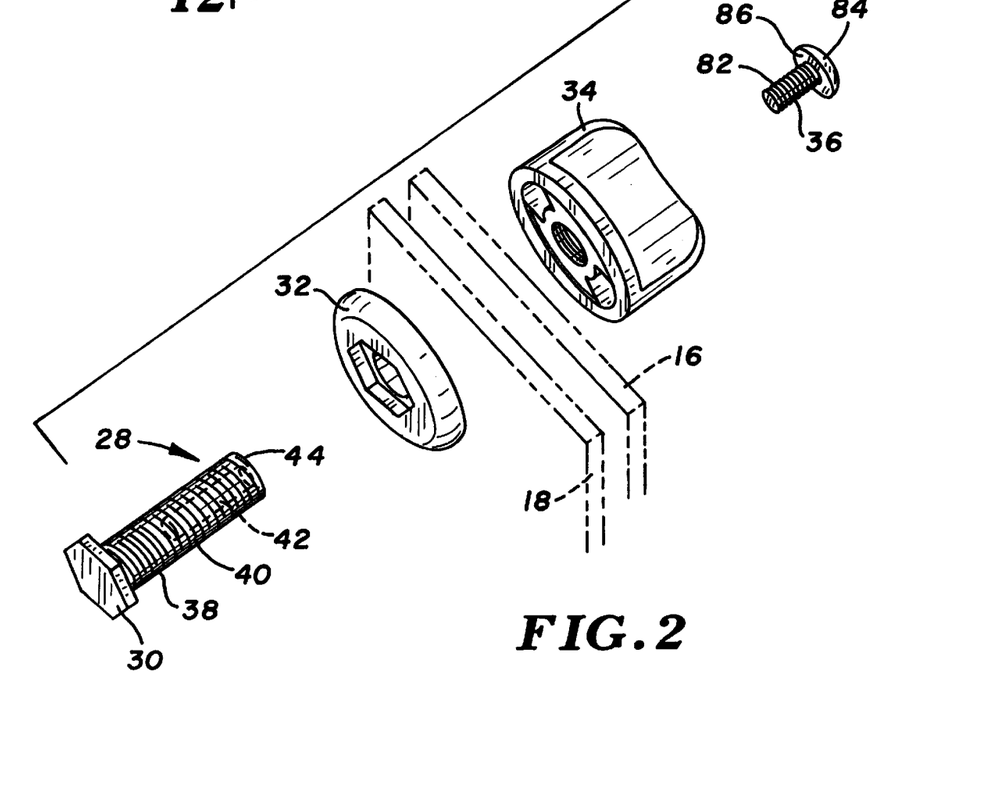
FIG. 2 is an exploded parts view of one of several fasteners shown in FIG. 1.

FIG. 2 is a prospective, exploded-parts view showing the individual elements of fastener 26*a*: namely, a stud or bolt 28, a button or cap 32, a clamping knob 34, and a retaining member 36. As indicated by the broken lines, panels 16 and 18 when secured by the fastener are disposed between cap 32 and knob 34.

Bolt 28 (FIG. 3) includes an elongate axially extended shank 38 and a hexagonal head 30 at one end of the shank. Over most of its length, shank 38 is formed with external threads 40. An axially extended internal aperture 42 is formed in the shank, open to the opposite end 44 of the shank from head 30. Internal threads 46 are formed in the internal aperture. For reasons to be explained, internal threads 46 preferably have a relatively fine pitch, while the pitch of external threads 40 is relatively coarse. In a highly preferred example, the pitch of threads 46 is 1/32 of an inch and the pitch of threads 40 is 1/6 of an inch. Aperture 42 and shank 38 preferably are concentric, although their concentricity is not essential. Stud 28 preferably is formed of steel, and plated with zinc.

Figures 3, 4, 5, 6:
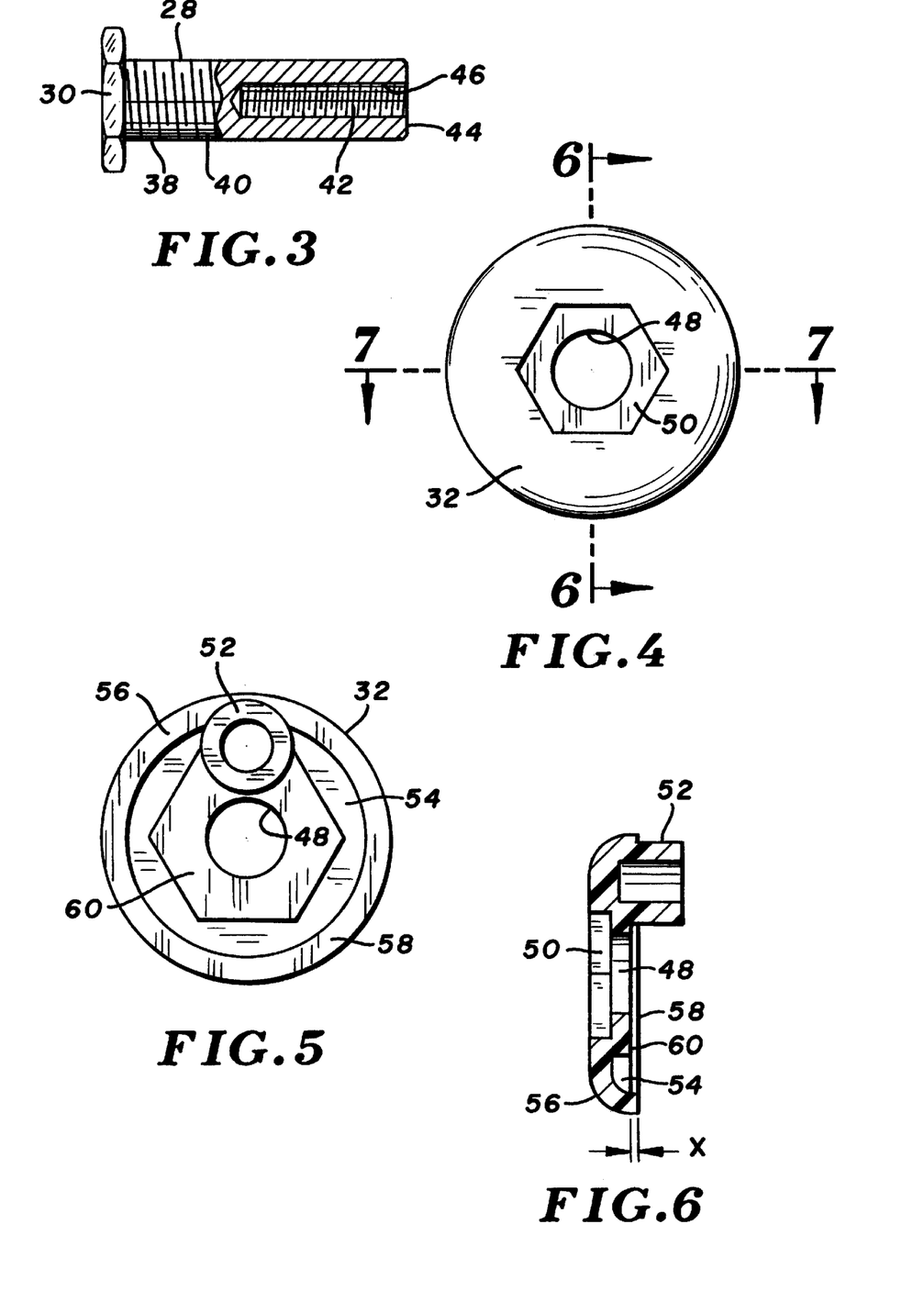
FIG. 3 is a sectional view of a shank of the fastener.
FIG. 4 is a top view of a cap of the fastener.
FIG. 5 is a bottom view of the cap shown in FIG. 4.
FIGS. 6 and 7 are sectional views taken along the lines 6—6 and 7—7, respectively, in FIG. 4.
Figures 7, 8, 9:
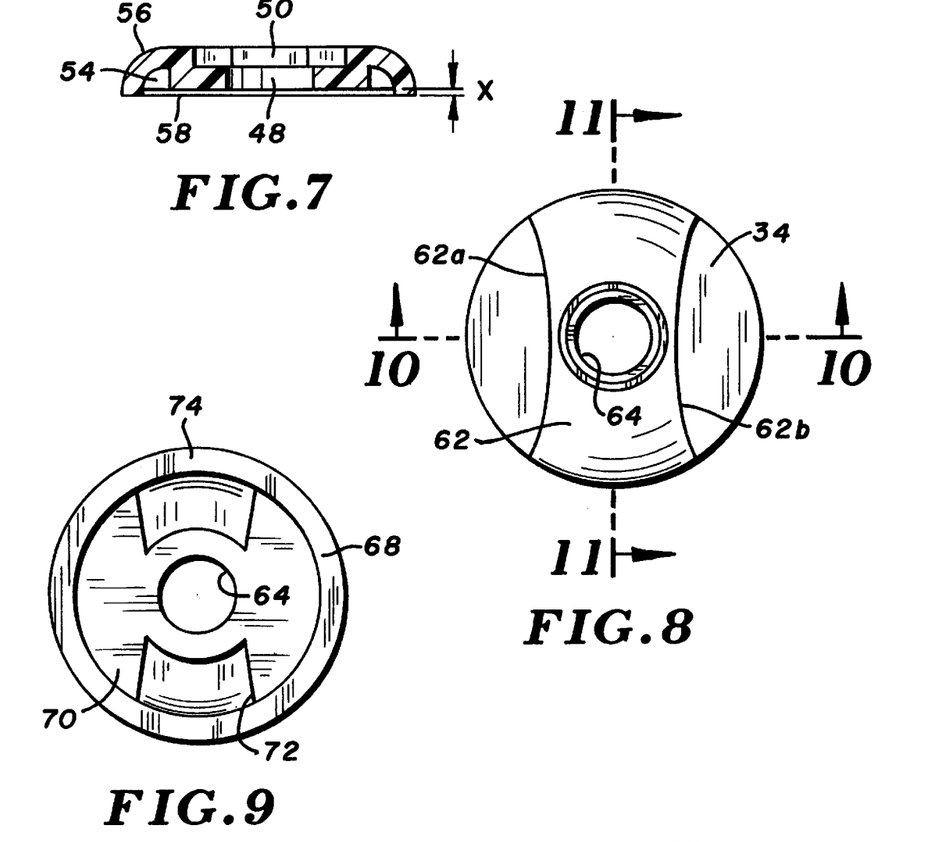
FIG. 8 is a top view of a clamping knob of the fastener.
FIG. 9 is a bottom view of the clamping knob.

Cap 32, as seen in the top view of FIG. 4, has a circular opening 48 through which shank 38 extends, and a hexagonal recess 50 to receive head 30. At the periphery of cap 32, the top surface is smooth and rounded, as best seen in FIGS. 6 and 7.

The bottom view of cap 32 (FIG. 5) shows a detent 52 radially spaced apart from opening 48. Detent 52 can be solid, or hollow as indicated, and extends from the bottom of cap 32 in the axial direction, downward as seen in FIG. 6. The cap is provided with a peripheral groove or cut-out 54 that defines an annular projection 56. Projection 56 has an outer edge 58 that faces downwardly (as viewed in FIG. 7) and extends beyond a planar bottom "0.020" surface 60 by a selected distance "x", e.g. about 0.020 inches. Projection 56 and outer edge 58 are annular, and preferably extend entirely about the cap except when interrupted by detent 52.

In alternative designs involving a larger cap, smaller-diameter detent or both, the detent can be positioned radially inwardly of the projection to allow its full circumferential extension.

The clamping knob is shown in detail in FIGS. 8–11. The top view (FIG. 8) reveals the arcuate shape of a handle portion 62, more particularly opposite side walls 62*a* and 62*b* having radii of curvature larger than the radius of the knob, designed to facilitate turning the knob by hand. A bore 64, formed through the center of the knob, has internal threads 66 of the same pitch as external threads 40 of shank 38.

Figure 10:
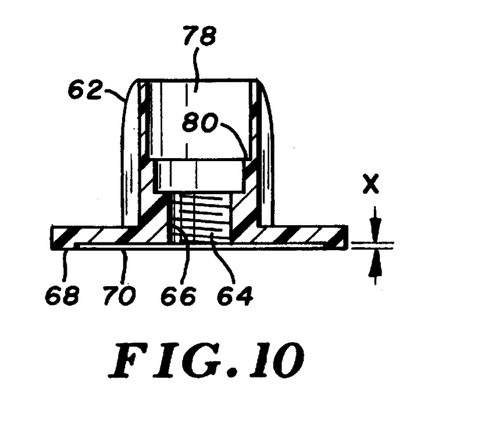
FIGS. 10 and 11 sectional views taken along the lines 10—10 and 11—11, respectively, in FIG. 8.
Figure 11:
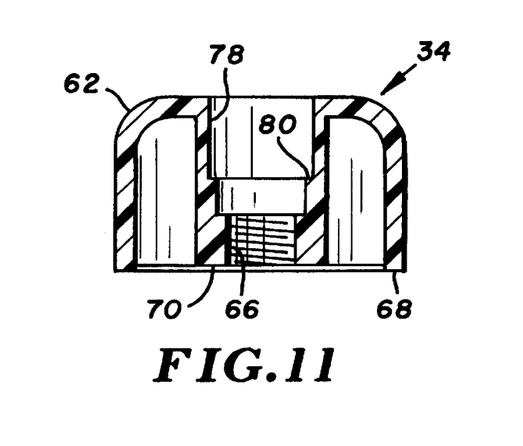

The bottom view of the knob reveals an annular clamping edge 68, shown in FIGS. 10 and 11 to project downwardly slightly beyond a radially inward portion 70 of the bottom surface. Cut-outs 72 extending into handle 62 are visible in FIGS. 9 and 11, and define peripheral projections 74 which have arcuate bottom edges forming part of annular clamping edge or face 68. Edge 76, like edge 58 of the cap, has about a 0.020 inch overextension.

As best seen in FIGS. 10 and 11, internal threads 66 are formed only along a lower (as viewed in the figures) portion of bore 64. The remainder of the bore is enlarged in diameter to provide a recess 78, open to the threaded portion of the bore and to the top of the knob. A lower section of the recess has a diameter less than the upper section, to define an annular shoulder 80 within the recess.

Returning to FIG. 2, retaining member 36 is preferably a screw with a threaded shaft 82 and a rounded head 84. The head has a Phillips-type opening for a driver, although a slotted, Allen-type or other drive opening would suffice. Threaded shaft 82 has a pitch equal to that of internal threads 46 in the internal aperture 42 of shank 38.

Retaining member 36, like stud 28, preferably is constructed of steel. By contrast, cap 32 and clamping knob 34 are resilient, preferably constructed of a polymeric material such as ABS or nylon.

In the preferred embodiment, cap 32 and stud 28 are attached to one another, e.g. by a press fit or by applying an adhesive to hexagonal head 30 or hexagonal recess 50 before seating the head within the recess. This provides a unitary clamping member to complement the other clamping member, knob 34. While it is adequate in some embodiments merely to couple cap 32 in an axially fixed relation to shank 38 leaving the cap free to rotate, other embodiments require that the cap and shank be integral.

Figures 12, 13, 14:
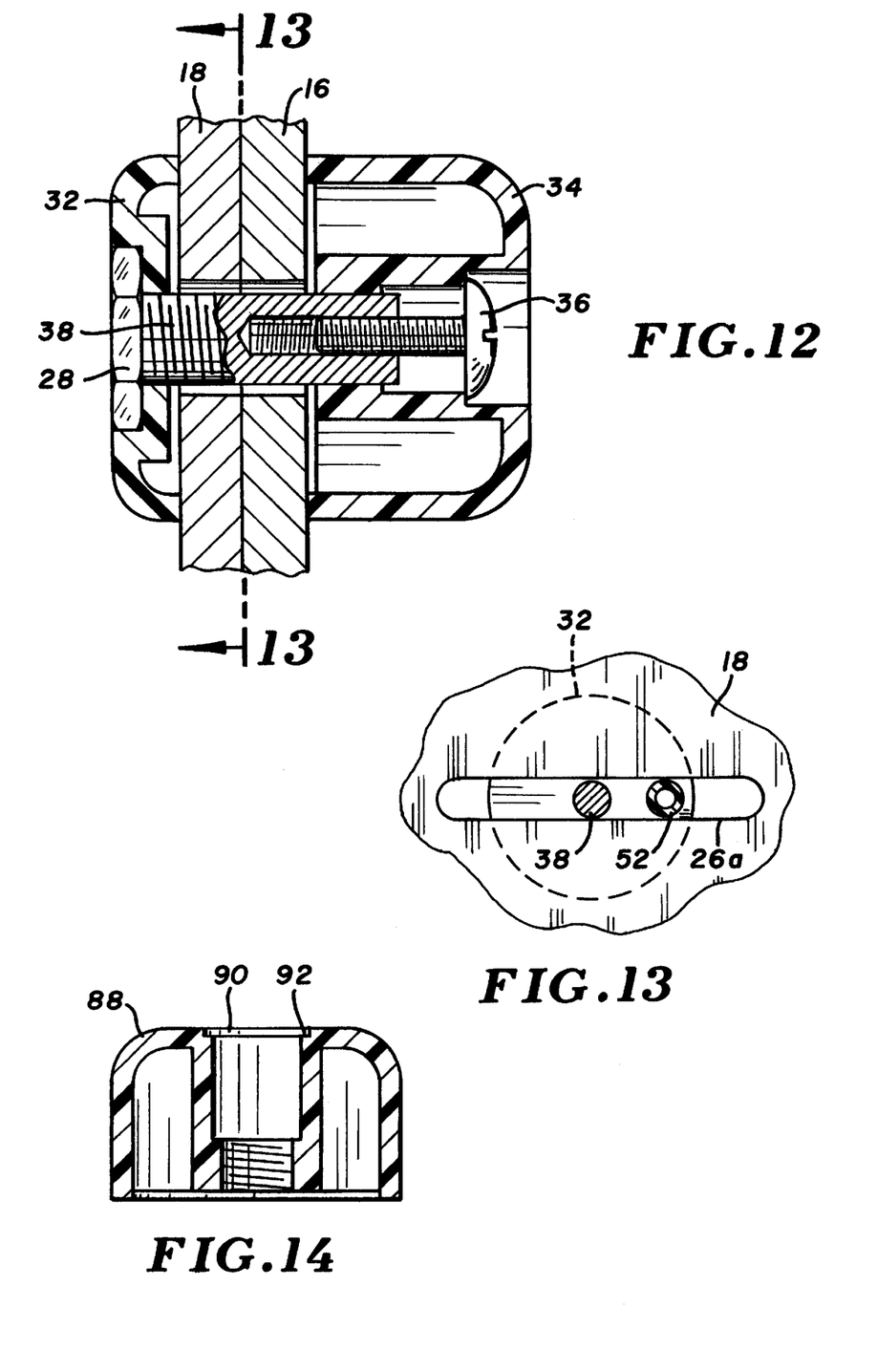
FIG. 12 is a sectional view taken along the line 12—12 in FIG. 1.
FIG. 13 is a sectional view taken along the line 13—13 in FIG. 12.
FIG. 14 is a sectional view of a clamping knob constructed according to an alternative embodiment of the invention.

FIG. 12 is a side sectional view of part of FIG. 1, showing fastener 26*a* clamping panels 16 and 18 together. A clamping face of cap 32, i.e. annular outer edge 58, is pressed against panel 18. Peripheral projection 56 or cap 32 is at least slightly elastically deformed, and thus an elastic restoring force is applied against the panel. At the same time, a clamping face of knob 34, i.e. annular edge 68, is pressed against panel 16. The clamping force is provided by tension along shank 38, applied to the cap through hexagonal head 30 and applied to the knob through the engagement of shank threads 40 and knob threads 66.

Projections 74 of the knob, or portions of the knob itself, are elastically deformed and thus an elastic restoring force is applied against panel 16. Thus, projections 74 and 56 behave as flexures, improving upon the clamping force available solely due to compression of the cap and knob in the axial direction as they are brought against the panels. The projections thus counteract the impact of long-term cold flow of the polymeric materials forming the knob and cap, reducing the risk that such cold flow will reduce clamping strength.

Because of the peripheral location of the projections, a larger annular clamping face is provided for a given thickness of the flexure, maximizing the clamping effectiveness for a given amount of elastic deformation. Also, given the yielding nature of the cap, knob and their projections, they provide the requisite clamping force without scratching or otherwise damaging the panels.

The flexure clamping also is considered superior in terms of its ability to maintain a secure hold despite exposure to shock or vibration, due to the tendency of the resitient material to absorb vibration.

The preferred over-extension of annular edge 68, designated "x" in FIGS. 10 and 1, is 0.02 inches (0.5 mm.). The desired over-extension varies with several factors, including the diameter of the knob, the thickness (radial dimension and length, axial dimension) of the projection, and the elasticity of the material involved. For example, the over-extension for a polypropelene knob (or cap) would be greater than the over-extension for the nylon element having the same size and shape. In any event, the amount of over-extension is chosen to avoid a "bottoming out" so that substantially the entire clamping force is provided through annular surface 76 of the knob and outer edge 58 of the cap.

In FIG. 12, knob 34 is shown in a clamping position, i.e., with its clamping face (annular edge 68) pressed against panel 16. The knob can be turned to withdraw it (to the right as viewed in the figure) to a locked position in which a locking face of the knob, i.e., shoulder 80, abuts a locking face of retaining member 36, i.e., the planar surface 86 of head 84, more particularly the annular peripheral portion of that surface along which the radius is larger than the inside radius of the shoulder.

As can be seen from FIG. 12, turning knob 34 to withdraw it axially away from panel 16, eventually brings shoulder 80 into contact with surface 86. Once the two locking faces are engaged, further withdrawal of knob is prevented. Retaining member 36 thus "locks" clamping knob 34 in the sense of preventing its further withdrawal.

Because of the threaded engagement of shaft 82 within interior aperture 42, retaining member 36 can be advanced into shank 38 or retracted, over a limited range, to selectively position the retaining member locking face, and thus control the degree to which knob 34 can be withdrawn. This combination of flexibility in location, and positive locking action, results from the threaded connections. More particularly, there is a mismatch in thread pitch, in that internal threads 46 of the shank and the threads of shaft 82 have a much finer pitch than external threads 40 of the shank and internal threads 66 of the knob, considerably enhancing the capacity of retaining member 36 to prevent rotation (retraction) of the knob, once the locking faces are engaged. Performance is superior to an arrangement in which all threads have the same pitch, and also is believed superior to an arrangement in which the retaining member/shank interface has a coarser pitch than the knob/shank interface.

As an alternative to the threaded engagement of retaining member 36 and shank 38, a spring pin or other feature could be employed in lieu of threaded shaft 82, to provide for a snap fit of the retaining member into the shank. This approach, however, does not allow selective axial positioning of the retaining member locking face, to adjust the locked position of the clamping knob. Accordingly, a threaded mounting of the retaining member usually is preferred.

As seen in FIG. 13, detent 52 of the cap, and shank 38, extend through slot 24a when panels 16 and 18 are clamped together by the fastener. Further, stud 52 extends axially into the slot by an amount sufficient to maintain the stud captured within the slot even when knob 34 is partially withdrawn from the clamping position. Accordingly, stud 52 keeps the cap and shank from rotating with knob 34 as the user turns the knob to withdraw it from the clamping position, and likewise prevents such rotation as the knob is advanced during tightening of the fastener.

As an alternative to containment in slots 24a, detent 52 can be adapted to be captured within a circular opening in a panel or other component, or to abut a ridge or other feature of a component that prevents rotation of the cap relative to the component.

FIG. 14 is a sectional view of an alternative clamping knob 88, suitable for use in fasteners 26, in lieu of knob 34. Knob 88 is resilient, can be formed of the same material used to form knob 34, and is substantially identical to knob 34 except for a differently shaped recess 90. More particularly, while recess 90 likewise has upper and lower sections, the upper section is substantially narrower to provide an annular locking shoulder 92 proximate the top surface of the knob. This prevents head 84 of retaining member 36 from becoming recessed within clamping knob 88 as the knob is withdrawn from a clamping position. Moreover, if retaining member 36 is turned substantially completely into shank 38 with knob 88 in the clamping position, surface 86 of head 84 is brought into engagement with shoulder 92, which locks knob 88 in the sense of keeping the knob in the clamping position, preventing any retraction by hand. A screwdriver or other appropriate tool is used to drive the retaining member into the shank sufficiently to lock knob 88 in this manner.

The arrangement using knob 34 is preferred for the convenience afforded by hand manipulation of the fasteners, avoiding the need for any driving tool during normal use of the fastening arrangement, yet insuring that the components of the fastening arrangement remain attached to the carseat or other support device. Conversely, concerns for child safety create the desire for fastening arrangements that remain secure against attempts to remove the fasteners by hand. In such cases, fastening arrangements that employ knob 88 are preferred. Or, given an internal aperture 42 of sufficient depth, a screwdriver or other tool can be used to tighten retaining member 36 against shoulder 80 of knob 34, such that the clamping position and the locked position substantially coincide.

Figure 15:
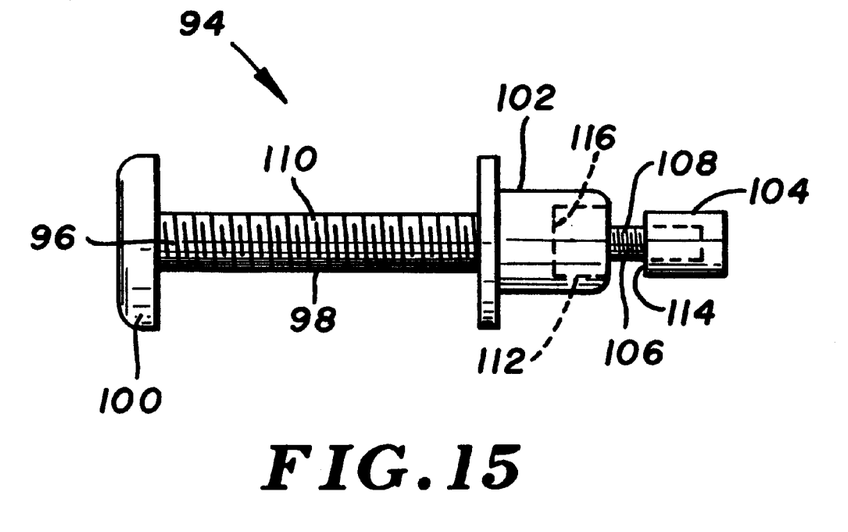
FIG. 15 is a side elevation showing a fastener with a threaded shank and a retaining cap constructed according to another alternative embodiment of this invention.

FIG. 15 shows an alternative embodiment fastener 94 including a clamping member 96 with a shank 98 and a cap 100 integral with the shank. The other components include a clamping knob 102 and a retaining member in the form of a sleeve 104.

Cap 100 is similar to first embodiment cap 32. Shank 98, however, differs from the first embodiment shank in that it includes a reduced diameter end region 106 remote from the cap. Two sets of external threads are provided along the shank, including fine-pitched threads 108 along end region 106 and coarser threads 110 along the larger-diameter portion of the shank. Clamping knob 102 has an internal bore therethrough, part of which includes internal threads having the same pitch as threads 1 10. Another portion of the bore provides a recess, shown in broken lines at 112. Sleeve 104 has internal threads that have the same pitch as threads 108 of the shank. Cap 100 and knob 102, as before, are formed with annular peripheral ridges or projections to provide opposed clamping faces for securing panels or other components. If desired, an antirotational element similar to detent 52 can be mounted to the cap.

The adjustable components are secured by turning the knob (typically clockwise) to advance it to the left as viewed in the FIG. 15. With knob 102 in the clamping position, sleeve 104 is advanced along end region 106, either until a locking face 114 of the sleeve engages a shoulder 116 within recess 112, or to an alternative position selected to allow limited travel of the knob when rotated by hand. If desired, sleeve 104 can be provided with a non-circular head (not shown) along the side opposite the locking face, to facilitate use of a driving tool to rotate the sleeve.

Figure 16:
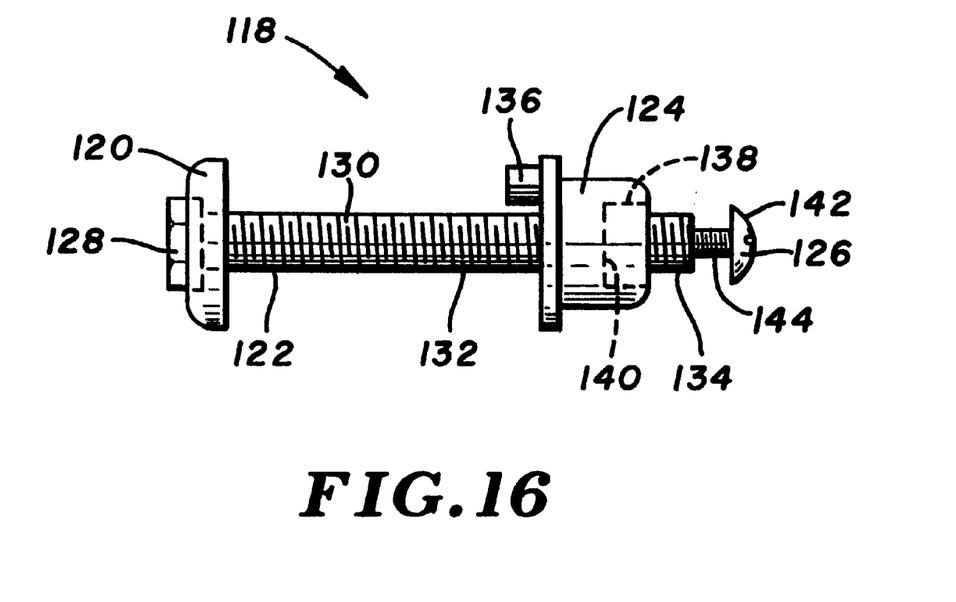
FIG. 16 illustrates another alternative embodiment fastener.

FIG. 16 illustrates a further alternative embodiment fastener 118 having a clamping member including a cap 120 and a bolt 122, a clamping knob 124 and a retaining member 126. Cap 120 and bolt 122 are not integrally secured. Rather, bolt 122 includes a round, disk-like head 128 that fits within a recess of the cap, and a shank 130 having external threads 132 and an internally threaded aperture at the end 134 opposite from head 128. Cap 120 is free to rotate relative to the shank, and to move axially along the shank in the direction toward end 134.

Knob 124 has an internal bore therethrough, part of which is internally threaded to match external threads 132. A detent 136 projects axially away from the knob, to prevent rotation of a knob in the same manner that detent 52 prevents rotation of cap 32. Another portion of the bore forms a recess 138 containing an annular shoulder 140 to provide a locking face.

Retaining member 126 includes a head 142 for providing the other locking face, and a shaft 144 provided with left-hand threads, to match the threads provided in the internal aperture of the shank. Because of the oppositely directed threads, i.e. left-hand as opposed to the right-hand threads along shank 130, knob 124 can be locked at different axial points by a selective positioning of the retaining member, without the need to provide threads of different pitches.

Cap 120 can be either free to move axially as shown, or axially fixed along bolt 122. In either event, the cap is rotatable relative to the bolt, so that a tool can be used to rotatably drive the bolt while the cap remains fixed. Head 128 of the bolt can be slotted, provided with a Phillips type or Allen type recess, or otherwise suitably configured to accommodate a driver. Detent 136 engages a slot or other feature of a panel or other component being secured, to prevent rotation of the knob while the bolt is being tightened.

In an alternative arrangement, a bolt such as bolt 122 can have a hexagonal, square or other noncircular head that fits into a similarly shaped recess in cap 120, thus to prevent the cap from rotating relative to the bolt. In this case detent 136, if provided at all, is secured to the cap rather than to the clamping knob.

Thus in accordance with the present invention, carseats, wheelchairs and other support devices can be adjusted to accommodate different individuals with ease, entirely by hand without the need for any tools. Alternatively, a tool can be employed to intentionally lock a given setting, to prevent loosening or reconfiguration by hand. As a further alternative, a retaining member can be positioned to allow limited travel of the locking knob between clamping and locked positions, when moved by hand. In the clamping position, peripheral flexures of the clamping knob and of an opposed cap engage panels or other components in a manner that avoids damage to the components and is not subject to a gradual degradation due to cold flow of the plastic material forming the knob and cap. The threads that couple the retaining member can be of a much finer pitch than the threads that mount the clamping knob to a shank integral with the cap, or these threads may be mismatched in some other respect, to assure positive locking action while also providing the option to axially adjust the locked position of the knob.

What is claimed is:

1. A threaded fastener for integrally and releasably securing two or more objects, including:

an elongate axially extended shank having first threads and second threads formed therealong;

a cap mounted to the shank and having a surface comprising a first clamping face;

a clamping knob having a bore therethrough internally threaded for a threaded engagement of the knob with the first threads of the shank, and further having a surface comprising a second clamping face opposed to the first clamping face of the cap when the knob and the shank are threadedly engaged, the surface of the knob further comprising a first locking face opposite the second clamping face;

a knob retaining member having a surface comprising a second locking face, and threaded for a threaded engagement with the second threads of the shank to enable a variable axial positioning of the retaining member relative to the shank, thus to facilitate a selective positioning of the second locking face for a surface engagement with the first locking face of the knob when the knob and shank are threadedly engaged, whereby the retaining member, due at least in part to a mismatch between said first threads and said second threads, tends to secure the knob against movement in a direction away from the cap when the locking faces are so engaged; and an internal aperture formed within the shank, extended axially and open to at least one end of the shank, wherein said first threads comprise external threads formed along the shank and the second threads comprise internal threads formed within the internal aperture;

wherein the retaining member includes an elongate shaft threaded for engagement within the internal aperture of the shank, and a head integral with the shaft and having a surface comprising said second locking face.

2. The fastener of claim 1 wherein:

said mismatch comprises a difference between a first pitch of the external threads and a second pitch of the internal threads.

3. The fastener of claim 2 wherein:

the second pitch is finer than the first pitch.

4. The fastener of claim 1 wherein:

at least a selected one of the knob and the cap is formed of a resilient material and includes a cut-out near a periphery of said selected one to define a peripheral flexure, with the associated one of said first and second clamping faces comprising an outer edge of said flexure; and wherein an axial movement of the associated clamping face into a clamping engagement against an object elastically deforms the flexure, causing the flexure to exert in elastic restoring force axially against the object.

5. The fastener of claim 4 wherein:

the knob and the cap are resilient, and include respective first and second cut-outs to provide respective first and second flexures, and wherein the first and the second clamping faces comprise, respectively, outer edges of the first and second flexures.

6. The fastener of claim 5 wherein:

the first and second cut-outs and the first and second edge surfaces are substantially annular.

7. The fastener of claim 1 further including:

a detent integral with the cap, radially spaced apart from the shank and extended axially away from the first clamping face toward said at least one end of the shank, said detent being adapted to encounter a feature of an object through which the shank extends, and thereby prevent any substantial rotation of the cap relative to the object.

8. The fastener of claim 7 wherein:

said feature is a wall defining a slot with a substantially uniform slot width, and said detent has a detent width substantially equal to and slightly less than the slot width.

9. The fastener of claim 1 wherein:

said bore incorporates a recess extended axially into the knob, and open to a side of the knob opposite said second clamping face, for at least partially containing the head of the retaining member when the first and second locking faces are in said surface engagement.

10. The fastener of claim 9 wherein:

the first locking face comprises a substantially annular shoulder disposed within the recess.

11. The fastener of claim 10 wherein:

said shoulder is disposed at a depth within the recess selected to allow axial movement of the knob between a clamping position in which the first and second clamping surfaces engage objects to releasably secure them, and a locked position in which the locking faces are in said surface engagement, and wherein the retaining member remains within the recess throughout said movement of the knob.

12. The fastener of claim 10 wherein:

the shoulder is selectably positioned so that a clamping position in which the first and second clamping faces engage objects to releasably secure them, and a locked position of the knob corresponding to said surface engagement of the locking faces, substantially coincide.

13. A fastener for releasably and adjustably coupling at least two parts; said fastener including:

an elongate axially extended shank having first threads formed therealong;

a cap mounted to the shank and having a surface comprising a first clamping face, and a detent integral with the cap, extended axially away from the first clamping face and spaced apart from the shank in a radial direction;

a clamping knob having a bore therethrough internally threaded for a threaded engagement of the knob and the first threads of the shank; and further having a surface comprising a second clamping face opposed to the first clamping face of the cap when the knob and shank are threadedly engaged; and wherein the shank is adapted for an extension through first and second openings formed in first and second parts, respectively, to releasably couple the first and second parts between the first and second clamping faces, and wherein the detent during said extension of the shank is positioned to encounter a feature of the first part to prevent rotation of the cap relative to the first part.

14. The fastener of claim 12 further including:

second threads formed along said shank, and a knob retaining member including a head having a surface comprising a first locking face, and a shaft integral with the head and adapted for a threaded engagement with the second threads of the shank to enable a variable axial positioning of the retaining member relative to the shank to facilitate a selective positioning of the first locking face for surface engagement with a second locking face of the knob, whereby the retaining member tends to secure the knob against movement along the shaft in a direction away from the cap when the first and second locking faces are in said surface engagement.

15. The fastener of claim 14 further including:

an internal aperture extended axially within the shank and open to at least one end of the shank; and wherein said first threads are external threads, said second threads are internal threads formed along the internal aperture, and the shaft of the knob retaining member is externally threaded and adapted for containment within the internal aperture.

16. The fastener of claim 13 wherein:

the retaining member tends to so secure the knob, due at least in part to a mismatch between a first pitch of the first threads and a second pitch of the second threads.

17. The fastener of claim 13 wherein:

the knob and cap are formed of resilient materials, and are shaped to provide respective first and second peripheral flexures, wherein the first and second clamping faces comprise outside edge surfaces of the first and second flexures; and wherein the cap and the knob are elastically deformed when the first and second parts are releasably secured between the cap and the knob.

18. The fastener of claim 13 wherein:

said feature comprises a wall defining a slot through the first part, and the detent extends through the slot during said extension of the shank.

19. The fastener of claim 18 wherein:

the slot has a substantially uniform slot width, and the detent has a detent width substantially equal to and slightly less than the slot width.

20. A threaded fastener for releasably coupling two or more components, including:

a first clamping member comprising an elongate axially extended shank having first threads therealong, and a cap mounted to the shank and having a surface comprising a first clamping face; and a second clamping member comprising a knob having a bore therethrough internally threaded for threaded engagement with the first threads of the shank, said knob having a surface comprising a second clamping face opposed to the first clamping face of the cap when the knob and shank are threadedly engaged;

wherein the knob and the cap are resilient and shaped to define respective first and second peripheral flexures, with the first and second clamping faces comprising respective outer edge surfaces of the first and second flexures; and wherein the knob and cap are elastically deformed and the clamping faces are adapted to engage first and second components when the first and second components are releasably coupled between the knob and the cap, with the first and second flexures extended axially beyond other portions of the knob and cap, respectively, whereby each of the knob and cap, radially and inwardly of its associated clamping face, is adapted to be spaced apart from the first and second components.

21. The fastener of claim 20 further including:

second threads formed along said shank, and a knob retaining member having a surface comprising a first locking face and adapted for threaded engagement with the second threads of the shank to enable a variable axial positioning of the retaining member relative to the shank to facilitate a selective positioning of the first locking face for a surface engagement with a second locking face of the knob, whereby the retaining member tends to secure the knob against movement along the shank in a direction away from the cap when the first and second locking faces are in said surface engagement.

22. The fastener of claim 21 further including:

a recess in the knob, open to a side of the knob opposite the second clamping face and extended axially toward the clamping face.

23. The fastener of claim 24 wherein:

said second locking face comprises a shoulder in said recess, formed at a depth within the recess to allow axial travel of the knob between a clamping position wherein the first clamping face engages one of the components, and a locked position in which the first and second locking faces are in said surface engagement.

24. The fastener of claim 22 wherein:

the second locking face comprises a locking shoulder positioned in the recess selectively so that a clamping position of the knob when engaged with one of the components, and a locked position of the knob when the locking surfaces are in their surface engagement, substantially coincide.

25. The fastener of claim 21 wherein:

the tendency of the retaining member to secure the knob is due at least in part to a mismatch between a first pitch of the first threads and the second pitch of the second threads.

26. The fastener of claim 20 further including:

a detent integral with the cap, extended axially away from the cap and spaced apart radially from the shank, said detent being adapted to engage a feature of one of said components when the shank extends through openings in the components, thereby preventing rotation of the cap relative to said one component.

27. A system for selectively positioning an adjustable element of a support device, comprising:

a fixed component, and at least one first opening formed through the fixed component;

a moveable component integrally supporting a support device element, and at least one second opening formed through the moveable component;

a first clamping member comprising an elongate axially extended shank having first threads therealong, and a cap mounted to the shank and having a surface comprising a first clamping face;

a second clamping member comprising a knob having a bore therethrough internally threaded for threaded engagement with the first threads of the shank, said knob having a surface comprising a second clamping face opposed to the first clamping face when the knob and shank are threadedly engaged;

further characterized in at least one of the following respects:

(i) to further comprise a knob retaining member having a surface comprising a first locking face and having threads, the shank having second threads for a threaded engagement with said threads of the knob retaining member to enable a variable axial positioning of the retaining member relative to the shank, and wherein the surface of the knob further comprises a second locking face opposite the second clamping face, whereby the variable axial positioning of the retaining member facilitates a selective positioning of the second locking face for a surface engagement with the first locking face of the knob when the knob and shank are threadedly engaged, whereby the retaining member, due at least in part to a mismatch between the first threads and the second threads, tends to secure the knob against movement in a direction away from the cap when the locking faces are so engaged;

(ii) to further comprise a detent integral with the cap, extended axially away from the cap and spaced apart from the shank in the radial direction, wherein the shank is adapted for an extension through the first and second openings to releasably couple the components between the first and second clamping faces, and wherein the detent, during said extension of the shank, is positioned to encounter a feature of one of the components to prevent rotation of the cap relative to said one component; and (iii) in that at least a selected one of the knob and the cap is resilient and includes a peripheral cut-out open to its associated one of the first and second clamping faces to define a peripheral flexure, with the associated one of the first and second clamping faces comprising an outer edge of the flexure, and wherein the selected one of the knob and cap is elastically deformed when the first and second components are releasably coupled between the knob and the cap.

28. A threaded fastener for releasably coupling two or more components, including:

a first clamping member comprising an elongate axially extended shank having first threads therealong, and a cap mounted to the shank and having a surface comprising a first clamping face;

a second clamping member comprising a knob having a bore therethrough internally threaded for threaded engagement with the first threads of the shank, said knob having a surface comprising a second clamping face opposed to the first clamping face of the cap when the knob and shank are threadedly engaged; and second threads formed along said shank, and a knob retaining member having a surface comprising a first locking face and adapted for threaded engagement with the second threads of the shank to enable a variable axial positioning of the retaining member relative to the shank to facilitate a selective positioning of the first locking face for a surface engagement with a second locking face of the knob, whereby the retaining member tends to secure the knob against movement along the shank in a direction away from the cap when the first and second locking faces are in said surface engagement;

wherein at least a selected one of the knob and the cap is resilient and shaped to define a peripheral flexure, with the associated one of the first and second clamping faces comprising an outer edge of the flexure;

wherein the selected one of the knob and cap is elastically deformed when first and second components are releasably coupled between the knob and the cap; and wherein the knob has a recess open to a side of the knob opposite the second clamping face and extended axially toward the clamping face.

29. The threaded fastener of claim 28 wherein:

the cap and the knob are resilient and shaped to provide respective first and second flexures, and are elastically deformed when the cap and knob releasably couple the first and second components, with the first and second clamping surfaces comprising outer edge surfaces of the first and second flexures, respectively.

30. The fastener of claim 28 wherein:

said retaining member tends to secure the knob at least in part due to a mismatch between a first pitch of the first threads and a second pitch of the second threads.

* * * * *